(12) United States Patent
Reid

(10) Patent No.: US 9,483,243 B2
(45) Date of Patent: Nov. 1, 2016

(54) INTERLEAVING DATA ACCESSES ISSUED IN RESPONSE TO VECTOR ACCESS INSTRUCTIONS

(71) Applicant: ARM Limited, Cambridge (GB)

(72) Inventor: Alastair David Reid, Fullbourn (GB)

(73) Assignee: ARM Limited, Cambridge (GB)

( * ) Notice: Subject to any disclaimer, the term of this patent is extended or adjusted under 35 U.S.C. 154(b) by 31 days.

(21) Appl. No.: 14/665,142

(22) Filed: Mar. 23, 2015

(65) Prior Publication Data

US 2015/0261512 A1    Sep. 17, 2015

Related U.S. Application Data

(63) Continuation of application No. 13/200,656, filed on Sep. 28, 2011, now Pat. No. 9,021,233.

(51) Int. Cl.
*G06F 9/30* (2006.01)
*G06F 9/45* (2006.01)
(Continued)

(52) U.S. Cl.
CPC ............. *G06F 8/4441* (2013.01); *G06F 8/443* (2013.01); *G06F 8/445* (2013.01); *G06F 8/45* (2013.01); *G06F 8/452* (2013.01); *G06F 9/30* (2013.01); *G06F 9/30036* (2013.01); *G06F 9/30043* (2013.01); *G06F 9/30087* (2013.01); *G06F 9/35* (2013.01); *G06F 9/3838* (2013.01)

(58) Field of Classification Search
CPC ........ G06F 8/443; G06F 8/445; G06F 8/452; G06F 9/30036; G06F 9/30043
See application file for complete search history.

(56) References Cited

U.S. PATENT DOCUMENTS

| 4,789,925 A | 12/1988 | Lahti |
| 4,870,569 A * | 9/1989 | Nakatani ............. G06F 15/8061 711/151 |
| 5,371,857 A | 12/1994 | Takagi |

(Continued)

FOREIGN PATENT DOCUMENTS

| EP | 0 340 453 | 11/1989 |
| EP | 0 620 533 | 10/1994 |

(Continued)

OTHER PUBLICATIONS

International Preliminary Report on Patentability mailed Apr. 10, 2014 in PCT/GB2012/052383, 10 pages.
(Continued)

*Primary Examiner* — Andrew Caldwell
*Assistant Examiner* — Jyoti Mehta
(74) *Attorney, Agent, or Firm* — Nixon & Vanderhye P.C.

(57) ABSTRACT

A vector data access unit includes data access ordering circuitry, for issuing data access requests indicated by elements of earlier and a later vector instructions, one being a write instruction. An element indicating the next data access for each of the instructions is determined. The next data accesses for the earlier and the later instructions may be reordered. The next data access of the earlier instruction is selected if the position of the earlier instruction's next data element is less than or equal to the position of the later instruction's next data element minus a predetermined value. The next data access of the later instruction may be selected if the position of the earlier instruction's next data element is higher than the position of the later instruction's next data element minus a predetermined value. Thus data accesses from earlier and later instructions are partially interleaved.

7 Claims, 12 Drawing Sheets

(51) Int. Cl.
*G06F 9/35* (2006.01)
*G06F 9/38* (2006.01)

(56) References Cited

U.S. PATENT DOCUMENTS

| | | | |
|---|---|---|---|
| 5,590,353 A * | 12/1996 | Sakakibara | G06F 9/345 708/520 |
| 7,734,676 B2 | 6/2010 | Dritschler et al. | |
| 2008/0288754 A1 | 11/2008 | Gonion et al. | |
| 2010/0042789 A1* | 2/2010 | Gonion | G06F 8/4441 711/154 |
| 2010/0217958 A1 | 8/2010 | Symes et al. | |
| 2012/0166761 A1 | 6/2012 | Hughes et al. | |

FOREIGN PATENT DOCUMENTS

EP   1 175 725   1/2002
EP   1 569 091   8/2005

OTHER PUBLICATIONS

International Search Report and Written Opinion of the International Searching Authority mailed Dec. 12, 2012 in PCT/GB2012/052383, 14 pages.

K. Asanovic, "Vector Microprocessors" dissertation, 1998, 268 pages.

C.G. Lee, "Code Optimizers and Register Organizations for Vector Architectures" dissertation, 1992, 170 pages.

J.W. Davidson et al, "Improving Instruction-level Parallelism by Loop Unrolling and Dynamic Memory Disambiguation" Proceedings of the 28$^{th}$ Annual International Symposium on Microarchitecture, 1995, 8 pages.

K. Skadron et al, "Design Issues and Tradeoffs for Write Buffers" Proceedings of the Third International Symposium on High-Performance Computer Architecture, Feb. 1997, 12 pages.

* cited by examiner

| $a_0$ | $a_1$ | $a_2$ | - | - | - | - |
| $b_0$ | $b_1$ | $b_2$ | - | - | - | - |

| $a_0$ | $a_2$ | $a_4$ | - | - | - | - |
| $a_1$ | $a_3$ | $a_5$ | - | - | - | - |
| $b_0$ | $b_2$ | $b_4$ | - | - | - | - |
| $b_1$ | $b_3$ | $b_5$ | - | - | - | - |

| a0 | a1 | a2 | a3 | a4 | a5 | a6 | a7 |
|----|----|----|----|----|----|----|----|
| b0 | b1 | b2 | b3 | b4 | b5 | b6 | b7 |

FIG. 10

| a0 | a2 | a4 | a6 |
|----|----|----|----|
| a1 | a3 | a5 | a7 |
| b0 | b2 | b4 | b6 |
| b1 | b3 | b5 | b7 |

INTERLEAVING DATA ACCESSES ISSUED IN RESPONSE TO VECTOR ACCESS INSTRUCTIONS

This application is a Continuation of U.S. patent application Ser. No. 13/200,656, filed Sep. 28, 2011, the entire contents of which are hereby incorporated by reference in this application.

INTRODUCTION

The present invention relates to the field of data processing and in particular to vector instructions for accessing a plurality of data storage positions.

One known technique for improving performance of a data processing apparatus is to provide circuitry to support execution of vector operations. Vector operations are performed on at least one vector operand, where each vector operand comprises a plurality of operand elements. Performing the vector operation involves applying the operation repetitively across the various operand elements within the vector operand(s).

In typical data processing systems that support performance of vector operations, a vector register bank will be provided for storing the vector operands. Hence, by way of example, each vector register within a vector register bank may store a vector operand comprising a plurality of operand elements.

In high performance implementations, it is also known to provide vector processing circuitry (often referred to as SIMD (Single Instruction Multiple Data) processing circuitry) which can perform the required vector operation in parallel on the various operand elements within the vector operands. In an alternative embodiment, scalar processing circuitry can still be used to implement the vector operation, but in this instance the vector operation is implemented by iterative execution of an operation through the scalar processing circuitry, with each iteration operating on different operand elements of the vector operands. It should be noted that there are intermediate implementations where a few vector elements may be processed together.

Vector data access instructions each instruct a plurality of data accesses. Generally a processing apparatus will not be able to perform all the data accesses specified by a vector access instruction in parallel with each other in a single cycle, the access will generally take several cycles. If a plurality of vector data access instructions are being executed, the access speeds may be increased if the data accesses from different vector data access instructions can be interleaved with each other. This is due to the opportunities to merge operations to related addresses that such interleaving introduces and to the possibility to find additional parallelism.

In some cases the accesses performed are completely independent of each other and interleaving between them can be allowed thereby increasing the speed of the accesses. In other cases, they may not be independent of each other and they may therefore be constrained to execute in instruction stream order.

FIG. 1 shows an example of a vector access instruction for accessing addresses a0 to a7, followed by a vector access instruction for accessing addresses b0 to b7 according to the prior art. In the case that these instructions are processed in a system where no interleaving is allowed and where two data access requests can be issued in one clock cycle, then data access request b7 will be issued seven clock cycles after the instruction is received.

It would be desirable to provide an improved technique for supporting the execution of vector operations within a data processing apparatus that also supports scalar operations.

SUMMARY

Viewed from a first aspect, the present invention provides a vector data access unit for accessing data stored within a data store in response to decoded vector data access instructions, each of said vector data access instructions specifying a plurality of elements each of said elements indicating a data access to be performed, said plurality of elements being in an order within said vector data access instruction that said corresponding data access is instructed to be performed in; said vector data access unit comprising data access ordering circuitry for issuing data access requests indicated by said elements to said data store, said data access ordering circuitry being configured in response to receipt of at least two decoded vector data access instructions, an earlier of said at least two decoded vector data access instructions being received before a later of said at least two decoded vector instructions and one of said at least two decoded vector data access instructions being a write instruction and to an indication that data accesses from said at least two decoded vector data access instructions can be interleaved to a limited extent, to: determine for each of said at least two vector data access instructions, from a position of said elements within said plurality of elements which of said plurality of data accesses indicated by said plurality of elements is a next data access to be performed for said vector data access instructions, said data accesses being performed in said instructed order; determine an element indicating said next data access for each of said vector data access instructions; select one of said next data accesses as a next data access to be issued to said data store in dependence upon an order said at least two vector data instructions were received in and said position of said elements indicating said next data accesses relative to each other within their respective plurality of elements, subject to a constraint that a difference between a numerical position of said element indicating said next data access within said plurality of elements of a later of said vector data access instructions and a numerical position of said element indicating said next data access within said plurality of elements of an earlier vector access data instruction is less than a predetermined value.

The present invention recognises that vector instructions that specify a plurality of data accesses to be performed may take several cycles to perform and that it may be advantageous if interleaving of the accesses within the different vector instructions can be performed. For example, in general it is advantageous to perform loads before stores, as a processor may often need a load to be performed before it can perform a subsequent action and therefore reducing the latency of a load will often have a larger effect on performance than reducing the latency of a store will.

However, before interleaving instructions one needs to know that it is safe to do so. This generally requires address comparisons of the accesses to be made to check that the same address is not being accessed by any of the access requests that are being reordered. Addresses are generally quite long and thus, these address comparisons are expensive to perform. Furthermore, the number of address comparisons for a vector operation is large as a single vector memory operation can use eight different addresses. Thus, a vector load/store unit capable of buffering/reordering 4 vector memory accesses would have to be capable of buffering/reordering 32 addresses. The present invention recognises that vector memory accesses may be able to be significantly reordered without the large number of address comparisons that are usually required to ensure safety. In particular, it recognises that in a correctly vectorised loop the data accesses are free of RAW (read after write) and WAW (write after write) hazards and thus, only a subset of address comparisons need to be performed to allow safe interleaving of data accesses.

Thus, it allows interleaving provided that a difference between a numerical position of said element indicating said next data access within said plurality of elements of a later of said vector data access instructions and a numerical position of said element indicating said next data access within said plurality of elements of an earlier vector access data instruction is less than a predetermined value, in other words the progress of the accesses from the later vector data access instruction are constrained by the progress of the earlier vector data access instruction. It should be noted that it is the relative value of these two numerical positions that is required to be known, and this can be determined by a subtraction or by any other comparison means.

In some embodiments, said constraint further comprises that a data access request indicated by an element from said earlier vector data access instruction is not issued after a data access request indicated by an element located at a corresponding position in said plurality of elements in said later vector data access instruction.

The constraint may be that the later vector data access instruction is now allowed in effect to partially overtake the earlier vector data access instruction. This means that some element accesses instructed by one instruction may be performed before or in parallel with element accesses instructed by a subsequent instruction.

In some embodiments, said data access ordering circuitry is configured to select as said next data access request to be issued, said next data access request from said later vector data access instruction in preference to said next data access request from said earlier vector data access instruction provided that said constraint is satisfied.

Where the constraint is satisfied the ordering circuitry may select the data access request from a later instruction in preference to that from the earlier instruction. This increases interleaving without causing a hazard.

In some embodiments, said data access ordering circuitry is configured to issue at least two data access requests in parallel with each other in a same clock cycle; said data access ordering circuitry being configured to select said next access and at least one further data access to issue in parallel, said at least one further data access request being at least one of:

at least one data access indicated by a element subsequent to said element indicating said next access in said vector data access instruction; and at least one of said next accesses from one of said vector data access instructions not comprising said element indicating said next access;

said at least one further data access being selected in dependence upon a same constraint as said next data access is selected.

Where data access requests can be selected in parallel then the same constraints can be used to select the two data access requests that are to be issued.

In some embodiments, said data store to be accessed comprises one bank of a multiple bank memory.

The data store may be a bank within a multiple bank memory. In such a case the banks within the memory can be treated as individual independent storage units which each have their own constraints. If this is the case then memory accesses are allowed to proceed in parallel allowing a higher throughput, although you do have the overhead of separating and recombining accesses to different banks. Thus, in some embodiments it may be advantageous to treat a multiple bank memory as a single data store while in others each bank is treated independently.

As noted above, in some embodiments said data store comprises a plurality of banks of memory, each bank being independent of other banks, wherein said data access ordering circuitry is configured when selecting said at least one further data access to not apply said constraint on accesses between accesses selected in a same clock cycle that are to different banks.

When treating the banks independently then the constraints on accesses between different banks are not applied while the constraints are still applied to accesses to a same bank.

In some embodiments, the vector data access unit comprises at least two vector data access modules arranged in parallel with each other, each configured to receive a respective one of said at least two vector data access instructions, said data access ordering circuitry comprising:

a counter in each of said vector data access modules for storing an indication of said position of said element indicating said next data access of said respective vector data access instruction; and comparison circuitry for comparing a value of said counters;

issuing circuitry associated with each of said vector data access modules for issuing said next data access requests;

said data access circuitry being configured to transmit a signal to said issuing circuitry of one of said vector data access modules impeding an issue of said next data access request by said module in response to said comparison circuitry indicating said constraint will not be met if said next data access request is issued.

In the case of there being vector data access modules arranged in parallel then each may have a counter indicating a position of an element of the next data access within the vector and comparison circuitry for comparing these counters. The next data access request that is issued is issued in dependence upon the result of the comparison, which ensures that the required constraint is met.

In some embodiments, the vector data access unit comprises at least two vector data access modules arranged in parallel with each other each configured to receive a respective one of said at least two vector data access instructions, and wherein said data store comprises a cache comprising a plurality of cache lines, each of said cache lines storing a plurality of data items, said data access ordering circuitry comprising:

detection circuitry for determining if data access requests from said vector data access modules to be performed in a same clock cycle are to a same cache line and in response to determining they are combining said data accesses such that they are performed as a same data access.

It may be advantageous when accessing a cache to have detection circuitry that determines if a same cache line is to be accessed by access requests from different vector data access modules. The ability to interleave accesses to some extent may allow some access requests that are occur close to each other within a program stream and are to a same cache line to be combined. Accessing a cache is expensive in power and if a same cache line is to be accessed by two data access requests, then it would be advantageous if these accesses could be combined to form a single access. Some access patterns are such that it is likely that a cache line will be accessed by subsequent access requests and thus, the ability to interleave access requests combined with detection circuitry to detect accesses to a same cache line can in some instance provide significant improvements in efficiency.

In some embodiments, said at least two vector data access instructions comprise at least two of a vector load instruction and vector store instruction, said vector data access unit further comprising:

a vector register store for storing a plurality of vectors each comprising a plurality of vector operands, at least two of said vectors comprising a plurality of addresses indicating data storage locations of said plurality of data accesses indicated by a respective one of said at least two vector data access instructions.

A second aspect of the present invention provides a data processing apparatus for processing data comprising: fetching circuitry for fetching instructions to be processed; decode circuitry for decoding said instructions; processing circuitry configured to perform operations in response to said decoded instructions; and said vector data access unit according to a first aspect of the present invention for accessing said data to be processed in response to vector data access instructions.

In some embodiments, said decode circuitry is configured in response to an instruction indicating limited interleaving is allowable to provide said vector data access unit with said indication that data accesses from said earlier and later vector data access instructions can be interleaved to a limited extent.

It may be advantageous to have decode circuitry that is configured to respond to an instruction that will indicate where the limited interleaving is allowable. Having such an instruction allows the vector data access unit to know whether to compare the element positions and determine whether or not the constraints are met. If no interleaving is allowed then such comparisons are not required and produce no benefit. There may be portions of an instruction stream where interleaving is appropriate and other portions where it is not. Thus, this instruction can be particularly advantageous.

In some embodiments, said instruction indicating limited interleaving is allowable comprises at least one of a vector load instruction, a vector store instruction, a start limited interleave instruction, an instruction for setting a limited interleave flag, and an instruction for setting a vector control register.

The instruction indicating limited interleaving may be a specific instruction indicating this or it may be an instruction such as a vector load instruction or a vector store instruction. It may be that vector loads and vector stores can always be interleaved and thus, detecting one of these is sufficient to indicate that interleaving may be allowable. Alternatively, in some embodiments there is a flag that is set that indicates this and thus, an instruction for setting this flag or for setting a vector control register may be the instruction that indicates that interleaving is now allowable.

In some embodiments, said instruction indicating limited interleaving is allowable comprises said start limited interleaving instruction and said start limited interleave instruction comprises said predetermined value indicating a degree of interleaving.

In the case that the instruction indicating that limited interleaving is allowable is a start limited interleaving instruction then this instruction may comprise the predetermined value that indicates the degree of interleaving. This may be helpful as some sections of the instruction stream may allow a certain amount of interleaving while others may allow a different amount. Having the predetermined value within the instructions allows different amounts of interleaving to be performed for different sections of code.

In some embodiments, said decode circuitry is configured in response to an instruction indicating limited interleaving is no longer allowable to provide said vector data access unit with an indication that data accesses from vector data access instructions can not be interleaved to a limited extent.

There may also be an instruction that indicates that limited interleaving is no longer allowable and that comparisons of the element positions are no longer appropriate.

This instruction may be a stop limited interleaved instruction or it may be a backward branch instruction.

A backward branch instruction indicates that a portion of code is being entered where interleaving is inappropriate and thus, if this is recognised there is no need to have a further stop interleaving instruction.

In some embodiments, the data processing apparatus further comprises a flag data store for storing a flag value indicating data accesses from said earlier and later vector data access instructions can be interleaved to a limited extent, said vector data access unit comprising a detector to detect said flag value.

As noted earlier it may be appropriate to have a flag value to indicate that data accesses can be interleaved.

In such a case an exception may clear this flag value as an exception will indicate that a different portion of code is being taken and it may no longer be appropriate in this different portion of code to interleave data accesses, and thus, clearing the flag on taking an exception will enable the operation to remain safe.

A third aspect of the present invention provides a method of compiling a computer program, comprising:

analysing said computer program and identifying loops within said computer program and converting scalar instructions within said loops to vector instructions, said vector instructions comprising vector data access instructions, each of said vector data access instructions specifying a plurality of elements each of said elements indicating a data access to be performed;

identifying a first vector data access instruction and a second data vector instruction within said program where limited interleaving of data accesses from said first and second vector data access instructions would not cause a data error;

inserting a start limited interleaving instruction into said computer program prior to said first vector data access instruction, said start limited interleaving instruction providing an indication to a vector data access unit that data accesses from said first and second vector data access instructions can be interleaved to a limited extent;

said limited extent being that a next data access indicated by a element from said second vector data access instruction is issued if a numerical position of said element within said plurality of elements of said second vector data access instruction subtracted from a numerical position of said element indicating a next data access of said first data access instruction is less than a predetermined value, and if it is not less than said predetermined value a data access from said first vector data access instruction is issued; and transforming said computer program into code suitable for execution on a data processing system.

An indication that interleaving can occur may be inserted into the code at the compiling stage. At this stage the code is analysed and it may be determined that interleaving is appropriate. In such a case the compiler may generate a start limited interleaving instruction which can be inserted into the code to indicate to a processor that limited interleaving can occur.

In some embodiments said start limited interleaving instruction comprises said predetermined value.

The amount of interleaving that is safe will depend on the code and thus, it may be appropriate for the compiler to insert an indication of the degree of interleaving that is possible into the start limited interleaving instruction.

In some embodiments said method of compiling comprises a further step of inserting a stop limited interleaving instruction after said identified vector data access instructions.

As for the start interleaving instruction when compiling the code one can determine where interleaving is appropriate and insert a stop instruction as necessary.

Where the first and second vector data access instruction that can be interleaved are within a loop then the start and stop interleaving instructions may be arranged in a number of places. For example, the start interleaving instruction may be generated before the loop or within the loop with the stop within the loop or outside of the loop.

In other embodiments where backward branches are identified within the computer program, these may be understood by the processing system to indicate that one should stop interleaving in which case only start interleaving instructions are inserted into the code and not stop interleaving instructions where the backward branches are located at an end of said interleaving region.

According to a fourth aspect of the present invention there is provided a compiler for compiling a computer program, comprising: analysing circuitry for analysing said computer program and identifying loops within said computer program and converting scalar instructions within said loops to vector instructions, wherein said vector instructions comprise vector data access instructions, each of said vector data access instructions specifying a plurality of elements each of said elements indicating a data access to be performed; identifying a first vector data access instruction and a second data vector instruction within said program where limited interleaving of data accesses from said first and second vector data access instructions would not cause a data error; instruction generating circuitry for generating a start limited interleaving instruction and for inserting said start limited interleaving instruction into said computer program prior to said first vector data access instruction, said start limited interleaving instruction providing an indication to a vector data access unit that data accesses from said first and second vector data access instructions can be interleaved to a limited extent; said limited extent being that a next data access indicated by a element from said second vector data access instruction is issued if a numerical position of said element within said plurality of elements of said second vector data access instruction subtracted from a numerical position of said element indicating a next data access of said first data access instruction is less than a predetermined value, and if it is not less than said predetermined value a data access from said first vector data access instruction is issued; and transforming circuitry for said computer program into code suitable for execution on a data processing system.

According to a fifth aspect of the present invention there is provided a method of issuing data access requests to a data store in response to at least two vector data access instructions and to an indication that data accesses specified by said vector data access instructions can be interleaved to some extent, wherein each of said vector data access instructions list a plurality of sequential data accesses to be performed, said method comprising the steps of: determining for each of said at least two vector data access instructions which of said plurality of sequential data accesses is a next data access to be performed; determining for each of said next data accesses to be performed a relative position of said next data access within said listing of said plurality of sequential data accesses in said vector data access instruction compared to said other next data accesses; selecting one of said next data accesses to be issued as a next access to said data store from either of said at least two vector data access instructions in dependence upon said relative position, such that a data access from an earlier of said earlier and later vector data access instructions is not issued after an access at a corresponding position in said list of a sequential access of a later of said earlier and later vector data accesses requests.

According to a sixth aspect of the present invention there is provided a computer program product comprising a start limited interleaving instruction and subsequent first and second vector data access instructions, said start limited interleaving instruction when executed by a data processor controlling said data processor to start limited interleaving instruction of data accesses specified by said first and second subsequent vector data access instructions such that accesses performed in response to said first and second vector data access instructions can be interleaved to a limited extent; said limited extent being that a next data access indicated by an element from said second vector data access instruction is issued if a numerical position of said element within said plurality of elements of said second vector data access instruction subtracted from a numerical position of said element indicating a next data access of said first data access instruction is less than a predetermined value, and if it is not less than said predetermined value a data access from said first vector data access instruction is issued.

According to a seventh aspect of the present invention there is provided a computer program product storing in a non-transitory form a computer program for controlling a computer to provide a virtual machine execution environment for program instructions corresponding to a data processing apparatus according to a first aspect of the present invention.

The above, and other objects, features and advantages of this invention will be apparent from the following detailed description of illustrative embodiments which is to be read in connection with the accompanying drawings.

BRIEF DESCRIPTION OF THE DRAWINGS

FIG. 10 shows a coalesced access pattern of the vector access instructions illustrated in FIG. 1;

FIG. 11 shows a further coalesced access pattern;

DESCRIPTION OF EXAMPLE EMBODIMENTS

Figure 1:
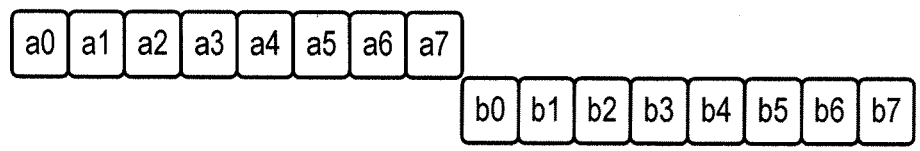
FIG. 1 shows the timing for data accesses of two vector instructions in a dual issue processor where interleaving is not allowed.
Figure 2:
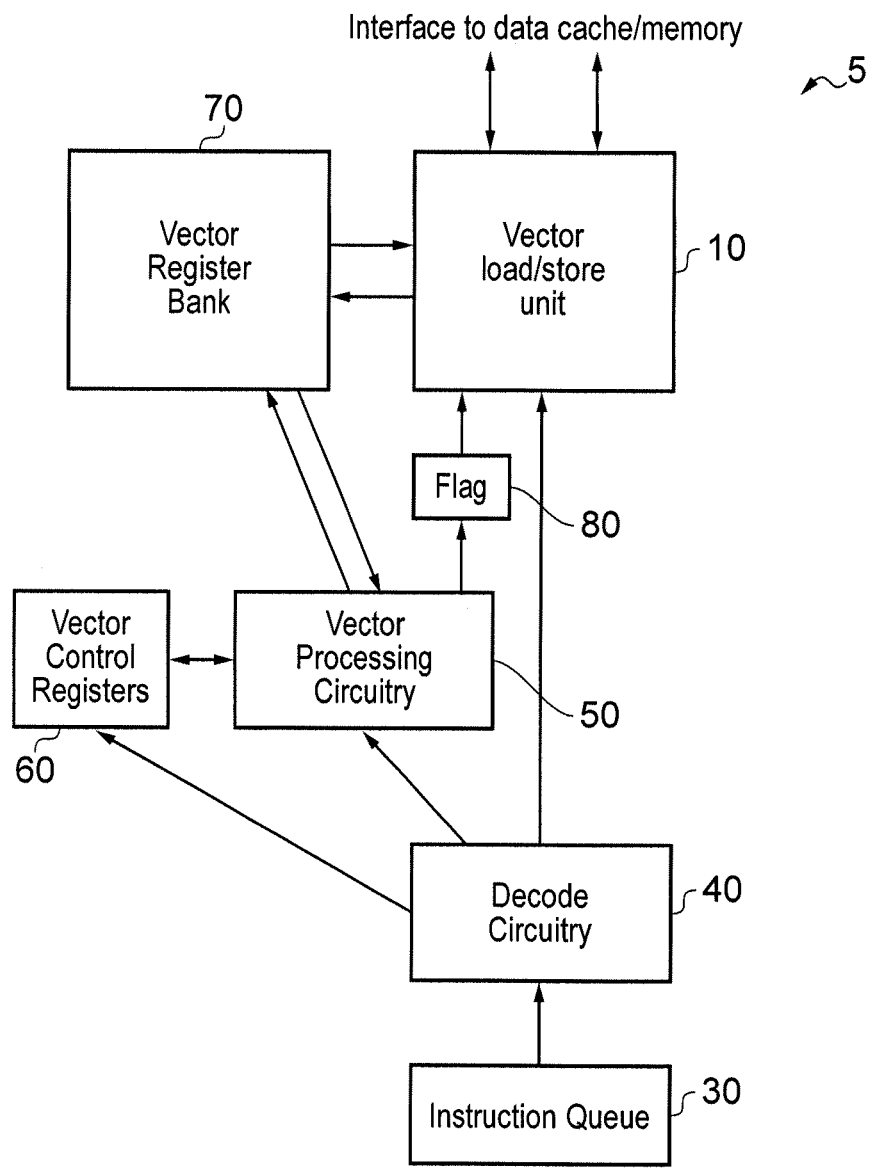
FIG. 2 shows a portion of a data processing apparatus according to an embodiment of the present invention.

FIG. 2 shows a portion of a data processing apparatus 5 according to an embodiment of the present invention. It only shows the vector processing portion and there may also be scalar processing circuitry, a scalar load/store unit and a scalar register bank, such that both vector and scalar instructions can be decoded and executed.

In this apparatus there is an instruction queue 30 holding instructions to be processed, decode circuitry 40 for decoding these instructions and vector processing circuitry 50 for processing vector instructions decoded by decode circuitry 40. In this embodiment there are also vector control registers 60 that store control values for the vector processing circuitry. These may be in the form of masks which are used to enable a vector instruction to only apply to certain of the vector operands or they may be other control values to control the vector processing.

In this embodiment there is also a vector load store unit 10 for receiving vector data access instructions and for performing accesses to a memory system in response to these access instructions. There is also a vector register bank 70 for storing vectors that are used in the processing of the vector instructions.

Thus, for example if a vector data access instruction is decoded this may reference a plurality of addresses to be accessed and these could be stored in a vector within vector register bank 70. Similarly, the plurality of data elements corresponding to the plurality of addresses will also be stored in vectors within vector register bank 70.

In this embodiment there is also a flag 80 that is set by vector processing circuitry in response to detecting vector data access instructions where the accesses can be interleaved with each other to a certain extent. Thus, during processing when such instructions are detected the flag is set and when they have been executed by a vector load store unit 10 and other instructions that do not allow interleaving are to be processed the flag is cleared. In this way, the vector load store unit knows whether the individual accesses from the different vector access instructions can be interleaved to a limited extent or can not be interleaved at all.

This flag may be called the checked address mode flag, indicating that when it is set some interleaving can occur as the addresses to be accessed obey certain rules.

While the constraints on interleaving can be expressed in multiple ways, one way is to consider whether a first element access associated with element number 'j' of a first vector and a second element access with element access with element number 'k' of a second vector. One of the simplest constraints on interleaving is that the first element access must always be performed before the second element access if j is less than k (j<k) but that the order can be reversed (i.e., the second element access may be performed before the first element access) if j is greater than or equal to k. In this document, we concisely describe this constraint by saying that the interleaving must satisfy the 'j<k' constraint.

To simplify support for exception handling, the checked address mode flag can be cleared when an exception is taken. (This will disable the optimization until it is set again so there is a tradeoff between preserving the checked address mode flag across exceptions and performance).

The flag may be set by start and stop instructions within the instruction stream, these instructions indicating by setting the flag that interleaving may now occur. They may be separate instructions or they can be combined with other instructions. For example, a backward branch could be treated as a stop instruction and cause the flag to be cleared.

Furthermore since the start of one loop iteration is also the end of the previous loop iteration, it may be useful in loops to combine the start and stop instructions into a single instruction. This behaves like a barrier between loop iterations indicating that element accesses from different loop iterations cannot be safely reordered without performing a dependency check.

The start instruction could indicate different patterns of legal reordering. For example, instead of requiring 'j<k' as above, it could indicate that element accesses cannot be reordered if 'j<=k' or, more generally, for some constant 'd', they cannot be reordered if 'j<k−d'. (This pattern occurs if the loop contains code like ' . . . =A[i+d]; A[i]= . . . ') If this is the case then there needs to be a store for this constant 'd' and this is shown as store 85 in FIG. 3.

Instead of using start and stop instructions, 'partial barriers' could be used. Whereas a conventional barrier prevents reordering of element accesses on either side of the barrier, a 'partial barrier' prevents reordering of element accesses if 'j<k'.

Instead of using start and stop instructions, we could have instructions that set a current 'barrier mode'. The barrier mode can be one of 'full, partial or none'. The current barrier mode affects all subsequent memory accesses by inserting either an implicit barrier or a partial barrier or no barrier before the memory access. Setting the current barrier mode to 'partial' behaves like the start instruction and setting the current barrier mode to 'full' behaves like the stop instruction.

Figure 3:
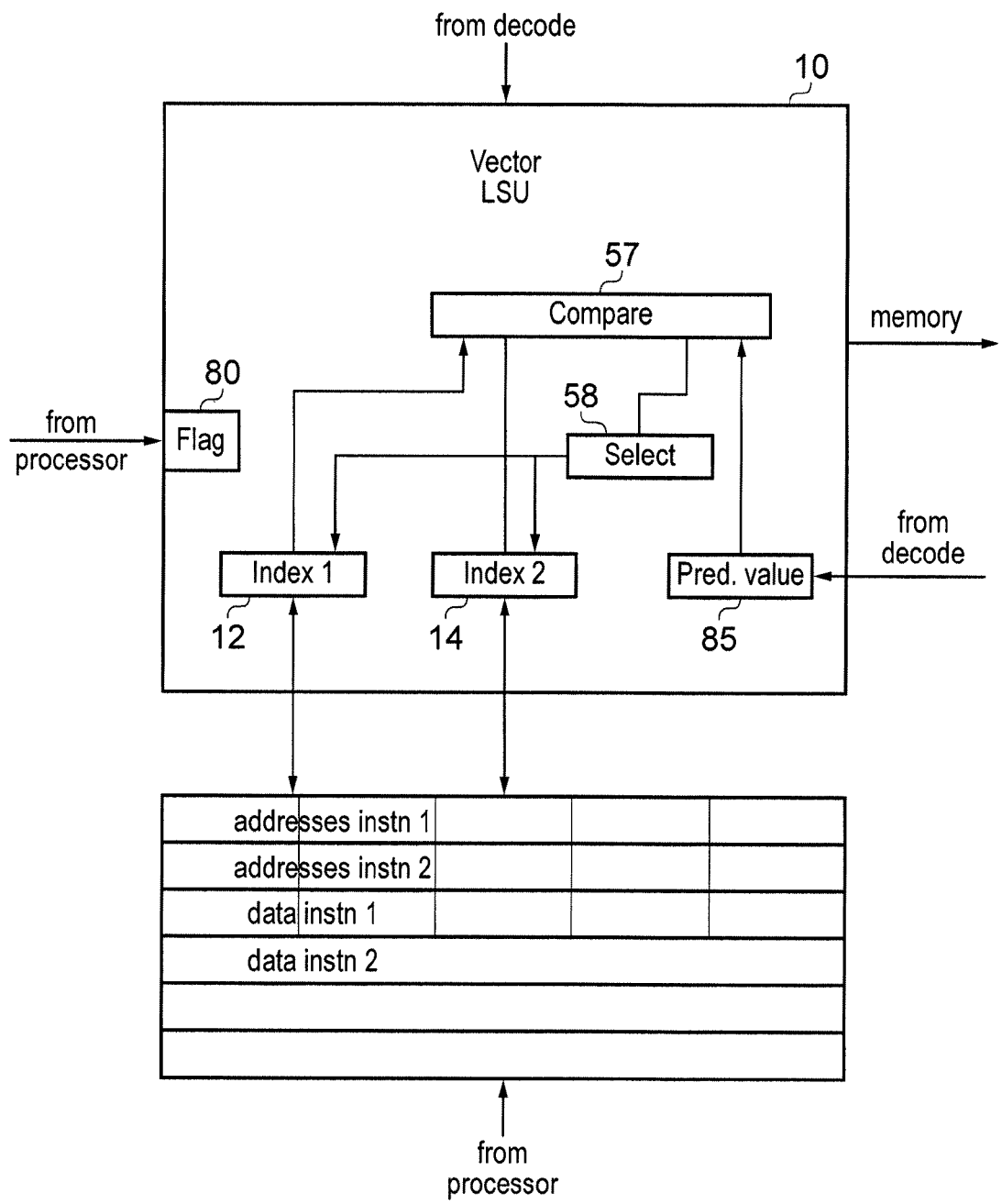
FIG. 3 shows a vector load store unit according to an embodiment of the present invention.

FIG. 3 shows the vector load store unit 10 of FIG. 2 in more detail. Within this vector load store unit there is comparison circuitry 57 for comparing the index values 12 and 14 received from two pending vector data access instructions, the index values indicates the element position of a particular data access request within the respective instruction. There is also selection circuitry 58 that selects a next data access request to be issued in dependence upon the result of the comparison.

Vector load store unit 10 also comprises a flag value store 80 for storing a flag value that is set by the processor and when set indicates to the LSU 10 that the individual data accesses specified by the two vector data access instructions can be interleaved to a certain extent. The extent to which the individual data accesses can be interleaved is determined by a value stored in predetermined value store 85. This value is set by the decoder and provides and indication of the degree of interleaving.

In this example, the flag 80 is set so interleaving is allowed and the predetermined value in store 85 is zero. This indicates that the extent to which data accesses from the two vector data access instructions can be interleaved is the extent that accesses from the second data access instruction must not overtake corresponding accesses from the first data access instruction. In other words index 1 (indicating the position of the currently pending data access from the first vector data access instruction within that instruction) must be greater than index 2 (indicating the position of the currently pending data access from the second vector data access instruction within that instruction). If this constraint is met then the data access from the second instruction is issued to memory, if not then the data access from the first instruction is issued to memory.

Thus, the accesses proceed and the index counters 12 and 14 are incremented as accesses from their respective instructions are performed. Thus, if initially index 1 and index 2 are at 0, comparison circuitry 57 would determine that the two values are equal and thus the requirement that index 1 is greater than index 2 is not met and selection circuitry 58 therefore selects the data access from instruction 1 and address 0 for instruction 1 is issued as the data access and the value of index1 is incremented. A comparison of the two index values then finds that index 1 is greater than index2 and thus, the constraint that the access index from instruction 2 must be less than the access index from instruction 1 is met and although then could in theory be selected, an access from instruction 2 is selected in preference. Thus, the address 0 from instruction 2 is used to access the next data element. It should be noted that if this load store unit can access two instructions in a single cycle then these two will be selected in the first cycle and performed together. The vector load store unit continues to select accesses to be performed in this manner. In this way the two instructions are processed at similar times and the latency of instruction 2 is reduced.

As noted previously there is a predetermined value store 85 for storing a value. In the embodiment previously described the selection criteria is simply that accesses from the second instruction must not overtake the first instruction and this value is therefore set to zero. However, in some cases there may be different requirements and if this is the case the predetermined value 85 stores a different predetermined value and the selection criteria may be that the difference between index 2 and index 1 should be less than this stored predetermined value. Provided this criteria is met either of the accesses can be selected but preferentially the data access from the later instruction is selected.

Figure 4:
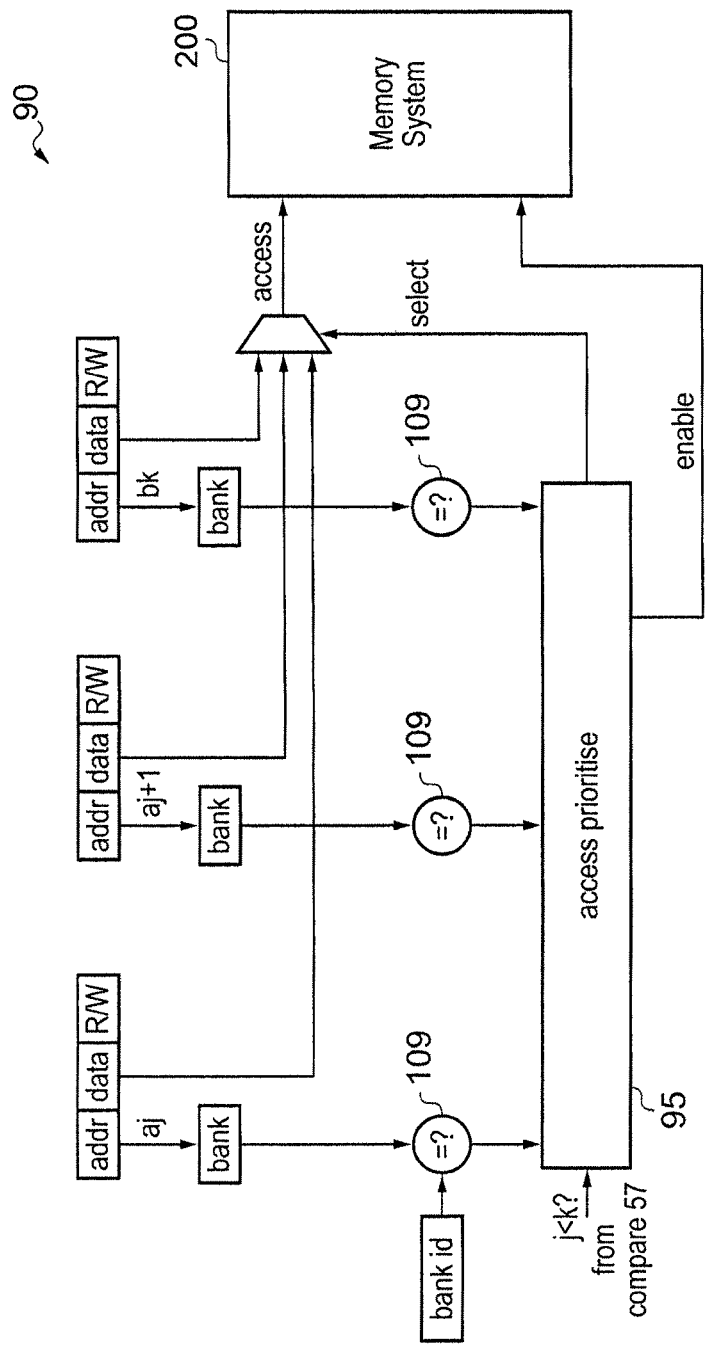
FIG. 4 shows a multiple vector load/store unit according to an embodiment of the present invention for accessing data stored in a plurality of memory banks.
Figure 5:
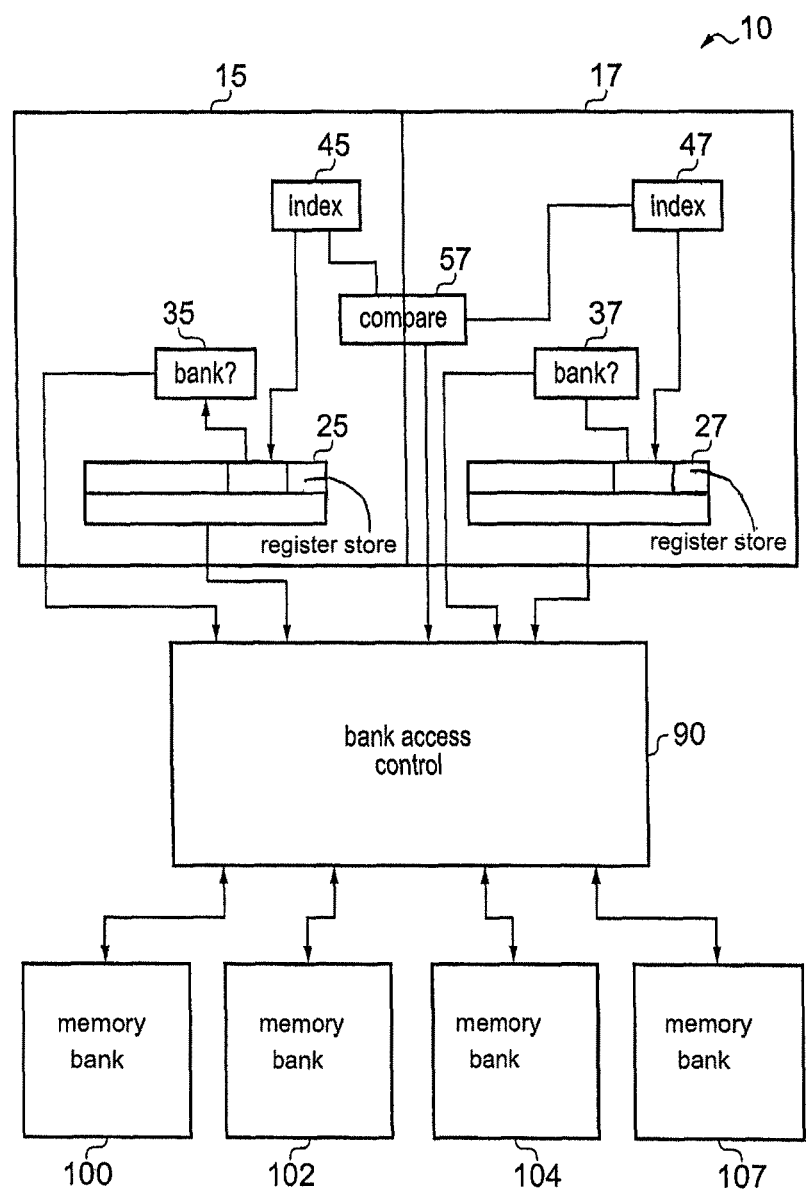
FIG. 5 shows a multiple vector load store unit for accessing a plurality of memory banks according to an embodiment of the present invention.

FIG. 5 shows a multiple vector load/store unit according to an embodiment of the present invention for accessing data stored in a plurality of memory banks. In this regard programs with gather scatter vector memory access instructions can have a high address bandwidth (i.e., many addresses are presented to the memory system per cycle) and therefore benefit from a memory system that can perform multiple accesses per cycle. This is frequently implemented by splitting the memory system (identified as 200 in FIG. 4) into a number of independently accessible banks and arranging the address map such that a vector memory access will typically access multiple banks—allowing the accesses to be performed in parallel with each other. This banking can be applied to several different parts of the memory system: the TLB, the L1 cache, the L2 cache, the DRAM controllers, etc.

In FIG. 5, vector load store unit 10 comprises two components 15 and 17, a first component 15 accessing data in response to a first vector data access instruction and a second component 17 accessing data in response to a second vector data access instruction.

Both of these components 15, 17 have register stores 25 and 27 respectively for storing address elements of pending vector data access instructions and for storing data corresponding to these access instructions. Thus, if the pending instruction is a write instruction, the data to be stored by the write instruction will be held within the register. While if the pending instruction is a read instructions there is space within the register for storing the data that is read.

There are also bank comparators 35 and 37 in each component that analyse the address of the data element to be accessed and determine from the address which memory bank of memory banks 100, 102, 104 and 107 is to be accessed.

Thus, a first vector data instruction is received at vector load store unit component 15 and is stored in register 25. A second vector data access instruction is received at vector load store unit component 17 and is stored in register 27. In this example, they are both write instructions.

The index counters 45 and 47 respectively are initially set to 0 and the first address element in registers 25 and 27 corresponding to these vector access requests is accessed and it is determined which bank the address is within. The comparison unit 57 compares the two indices and sends the results to bank access control unit 90. In addition to accessing the address element specified by index 47 the next address element in vector load store unit 15 is also accessed to determine which bank that is in. All of this information is provided to bank access control unit 90 which determines which accesses should be transmitted to the memory system.

FIG. 4 shows in more detail the bank access control unit 90 of FIG. 5. As noted above signals are received at this unit from the two load store unit components 15, 17. In this example there are three pending access requests that are being considered by the bank access control unit 90, these signals each comprise an address, the data associated with it and an indication of whether it is a read or write. The three signals comprise two data access requests for elements $a_j$ and $a_{j+1}$ from a first vector data access instruction received from the first vector load store unit component 15, and a data access request $b_k$ from the second vector data access instruction received from the second vector load store unit component 17.

Additional information indicating which bank these addresses are to be found in is also sent. For each bank, this additional information is compared with the bank ID by comparison circuitry 109 and it is determined which accesses are pending for which bank. If there is only one access pending for a particular bank then that access is transmitted to that bank and it is allowed to proceed.

If however there is more than one access pending for a bank then the access prioritising circuitry 95 determines which access is to be selected to be performed first. It determines this in response to a signal from the comparison circuitry 57 within load/store unit 10. This comparison circuitry determines whether k is less than j. If k is less than j then $b_k$ can be and is selected. If k is not less than j then the accesses from the second data access instruction have in effect caught up with the accesses from the first vector data access instruction and they need to be inhibited for a while, while the first vector data access instruction gains a lead again. In this case access $a_j$ is prioritised. In the case that $a_j$ was not to the same bank as $b_k$ but $a_{j+1}$ was to this bank then the prioritising circuitry 95 will determine which access to select based on whether k is less than j+1. If k is less than J+1 then $b_k$ can be selected. If however j+1 was less than k then access $a_{j+1}$ would have priority.

In this way, during a particular cycle the banks can be accessed independently of each other and the constraints that are usually enforced are not enforced between accesses to different banks but are enforced to accesses to the same bank. This clearly allows more accesses to be performed but has the overhead of additional comparisons and control circuitry.

In summary, a simple realization of a memory system that safely interleaves accesses within banks consists of:

A pair of new instructions indicating the start and end of a block of code

A load-store unit
  With a flag indicating if it is executing in 'checked address mode'
  Which sets the flag on encountering the start instruction and clears the flag on encountering the end instruction.
  With two vector memory unit (VMU) each containing:
    An element index j or k indicating which element is to be accessed next
    A flag indicating whether the VMU is performing a read a write or is idle
    A buffer of up to 2 pending element accesses consisting of the address and, if the access is a write, the value for each pending element access.
    A count of the number of pending element accesses
    Bank identification logic for each pending element access
  With a comparator to compare the element indexes in the two VMUs
  With four banks each containing:
    A multiplexer to select any of the pending element accesses from any of the VMUs
    Control logic to select pending element accesses [aj,a(j+1)] and [bk,b(k+1)] as follows:
      If j<k:
        Select aj if aj is for this bank
        Otherwise, perform no access to this bank
      If j>=k:
        If aj and bk are both for this bank, select bk
        If aj is for this bank and bk is for a different bank, select aj
        If bk is for this bank and aj is for a different bank, select bk
        If aj and bk are for different banks:
          If a(j+1) is for this bank, select a(j+1)
          Otherwise, perform no access to this bank
    With logic to update the values of j and k according to the number of accesses selected from each VMU.

This realization can be improved in various ways including combining it with a coalescing implementation described later so that accesses to the same bank can be coalesced into a single access.

Figure 6A:
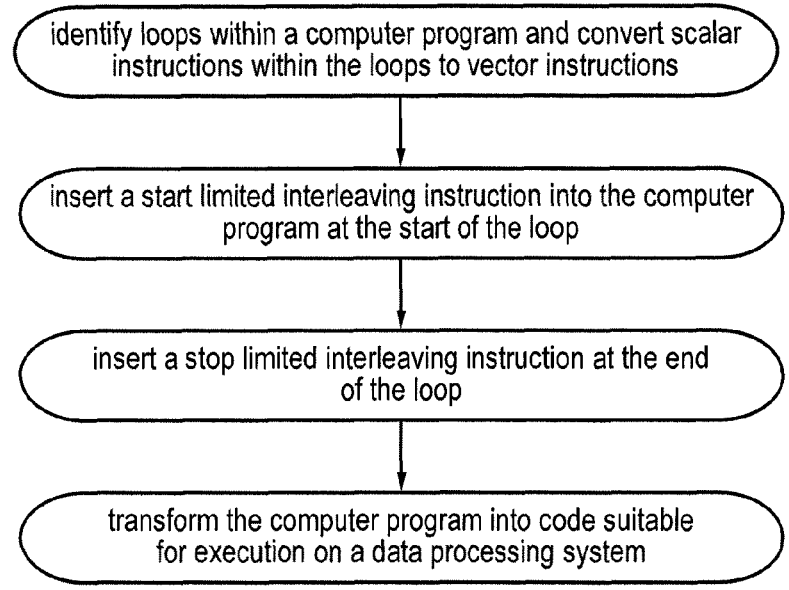
FIG. 6a shows steps in a method of compiling a program according to an embodiment of the present invention.

FIG. 6a shows a flow diagram illustrating steps in a method for compiling vectorised code. In this embodiment the compiler recognises loops in a computer program comprising scalar instructions and converts these to vector instructions. The compiler recognises that the task of vectorizing a loop involves performing an analysis to determine which memory dependencies exist. So if the compiler successfully vectorizes the loop, it already knows that the memory accesses within a vectorized loop do not conflict. Thus, it realises that interleaving of the data accesses can occur and to indicate this to the processing system processing the code it generates a start instruction at the start of the loop body and an end instruction at the end of the loop body.

This basic scheme can be enhanced in various ways:

In some circumstances, the compiler can insert a modified start instruction that indicates different patterns of legal reordering. For example, if it determines that all accesses performed inside a block of code are to distinct addresses, then it can emit a start instruction that indicates that reordering satisfying the constraint that 'j<=k' is correct or that any reordering is correct.

In US 2008/0288754 there is disclosed a 'CheckHazard' instruction which tests two vectors to determine if any addresses in position j of one vector overlap with any addresses in some position k (j<k) of the other vector. This instruction can be used to dynamically test (and deal with) any overlaps that would prevent the loop from being vectorized. This instruction works especially well with embodiments of the present invention because in effect it performs a test to check whether interleaving is possible or not. There is also a CheckhazardX instruction that checks positions such that j<=k. Thus, where this instruction has been used to test code, an indication that the accesses can be interleaved can be provided to the data processing system, either by setting a flag or by the use of a start limited interleaving instruction.

Figure 6B:
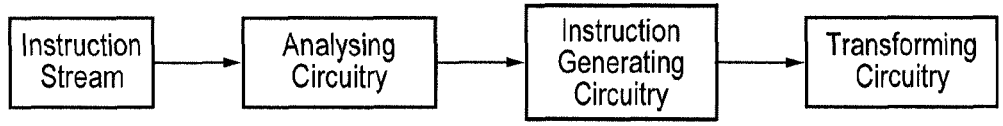
FIG. 6b shows a compiler according to an embodiment of the present invention.

Although the compiler may be formed of software in some cases it may be formed of hardware. FIG. 6b schematically shows a hardware compiler wherein an instruction stream is input to analysing circuitry where the instruction stream is analysed and loops are identified and vector code is formed. Portions of the code where interleaving of such vectors are also identified and start and stop instructions are inserted into the code, which is then transformed by transforming circuitry into code that can be executed by processing circuitry.

Figures 7, 8A, 8B:
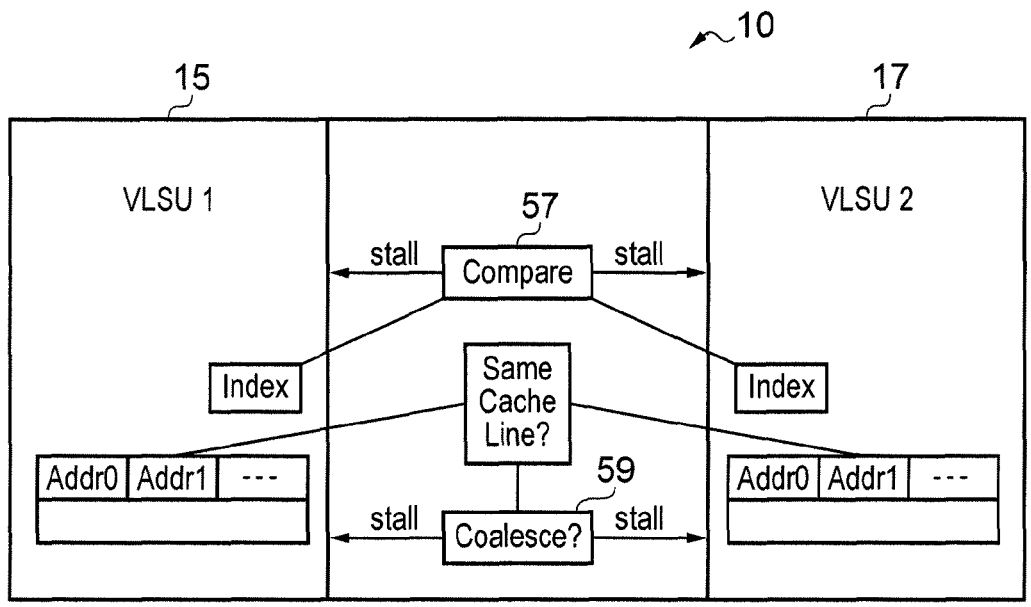
FIG. 7 shows a multiple vector store unit that allows coalescing of some cache accesses according to an embodiment of the present invention.
FIG. 8a shows data accesses from the multiple vector load store unit of FIG. 7 where coalescing is performed.
FIG. 8b shows data accesses where coalescing occurs between and within instructions.

FIG. 7 shows an example of how two vector load store units that access a same cache can have additional control circuitry which allows their accesses to coalesce. In this regard FIG. 7 schematically shows two vector load store units 15 and 17 with associated control circuitry which acts to compare the indices of the accesses from each load store unit to check that any interleaving rules are not broken and coalescing circuitry 59 which checks the addresses of pending data accesses and where they are to the same line and coalescing them will not break the interleaving rules they are coalesced into a single access.

It is advantageous to coalesce accesses to the same cache line both to improve performance and to reduce energy. In vector accesses, coalescing is typically performed within a single vector access to exploit locality within a vector but it is common for there to be significant locality between corresponding element positions in two vector accesses. For example, vectorizing a loop containing these two statements:

A[i][j].x=p;

A[i][j].y=q;

will result in a loop that contains two vector store instructions and, on a given iteration of the loop, the first vector store instruction may write to addresses: [1000, 2000, 3000, 4000, . . . ] while the second vector store instruction writes to addresses [1004, 2004, 3004, 4004, . . . ]. In this case, there is no locality within each vector access but there is considerable locality between the vector accesses and, ideally, the accesses would be performed in the order [1000, 1004, 2000,2004, 3000,3004, 4000,4004, . . . ].

This allows the accesses to be coalesced into a single access as illustrated in FIG. 8*a* which shows a coalesced access pattern with accesses a0 and b0 being coalesced into a single access.

In practice, spatial locality may be found within vector accesses as well as between vector accesses. For example, a first vector access may access elements at addresses [1000, 1008,1016,1024, . . . ] while a second vector access may access elements at addresses [1004,1012,1020,1028, . . . ]. In this case, it is desirable to coalesce element accesses within a vector access and to coalesce accesses between vector accesses. Such a case is shown in FIG. 8*b* where pairs of element accesses from a first vector operation are coalesced with pairs of element accesses from a second vector operation. This executes in 4 cycles compared with 16 cycles with no coalescing or 8 cycles if coalescing only occurs between or within vectors Some simple examples of how the code can be vectorized and interleaving can improve performance are given below.

Sequential Code (Before Vectorization)

```
for(i=0; i<N; ++i) {
  a[i]++;
  b[i] = a[i];
}
```

Vectorized Code which can have Limited Interleaving

```
for(i=0; i<N; i+=8) {
  start;
  v1 = vload(&a[i]);
  v2 = vadd(v1,1);
  vstore(&a[i], v2);    // this vector store
  v3 = vload(&a[i]);    // and this vector load are the ones of interest
  vstore(&b[i],v3);
  stop;
}
```

This allows limited interleaving because of a possible conflict between the first vstore and the second vload.

Without limiting the interleaving (i.e., allowing vector loads/stores to be reordered without constraint), would be fast but incorrect: one possible ordering of the writes (from the vstore) and the reads (from the vload) would incorrectly perform the read from a[0] before the write to a[0].

Without any interleaving would be correct but unnecessarily slow since all the writes to a[0] . . . a[7] would need to be performed before starting the reads from a[0] . . . a[7].

With limited interleaving (i.e., allowing a load to element k to occur before a store from element j only if j<k), the vectorized code runs faster and is correct.

By making small changes to the code, the exact details of the comparison required change slightly (and the example becomes a little more realistic)

```
for(i=0; i<N; ++i) {
  a[i]++;
  b[i] = a[i+2];    // changed a[i] to a[i+2]
}
```

With this change, the condition to enforce is 'j<k−2'. Or, more generally:

```
for(i=0; i<N; ++i) {
  a[i]++;
  b[i] = a[i+d];    // changed a[i] to a[i+d]
}
```

With this change, the condition to enforce is 'j<k−d'

To make this happen, we could encode the value of d into a 'start limited interleave' instruction to so that the comparison hardware in the VMU knows to test 'j<k−d'.

Finally, one should note that a significant advantage of embodiments of the present invention is that address comparators are not required to support interleaving, it is possible to add address comparators to allow additional reordering beyond that directly supported by the limited interleaving. That is, to allow a small amount of interleaving of accesses between one iteration of a loop and the next iteration, the code before/after the loop or the next vectorized loop. Since the comparators have less work to do, good performance can be achieved with fewer of comparators and/or by clock-gating the comparators more often.

A summary of various features of embodiments of the invention is set out below with reference to FIGS. 9*a* to 15.

Figure 9A:
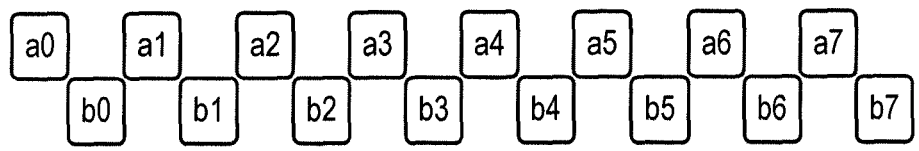
FIG. 9a shows the vector access instructions illustrated in FIG. 1 interleaved according to a first safely interleaved access pattern.

FIG. 9*a* shows a first safely interleaved access pattern shown with time proceeding from left to right and element accesses a0-a7 from the first vector access on a separate line from element accesses b0-b7 from the second vector access. Note that access aj occurs before access bk if j<k.

Figure 9B:
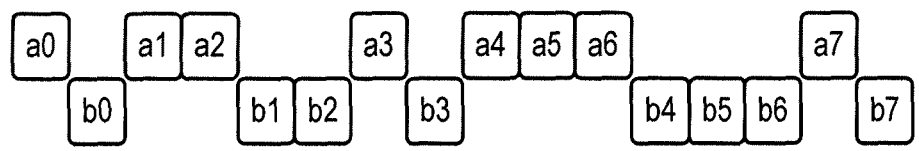
FIG. 9b shows the vector access instructions illustrated in FIG. 1 interleaved according to another safely interleaved access pattern.

FIG. 9*b* shows another safely interleaved access pattern shown with time proceeding from left to right and element accesses a0-a7 from the first vector access on a separate line from element accesses b0-b7 from the second vector access. Note that access aj occurs before access bk if j<k.

Figure 9C:
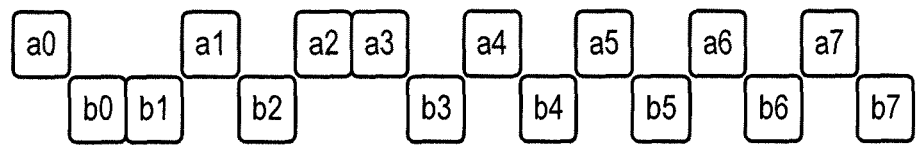
FIG. 9c shows the vector access instructions illustrated in FIG. 1 interleaved according to an unsafe access pattern.

FIG. 9*c* shows an unsafe access pattern shown with time proceeding from left to right and element accesses a0-a7 from the first vector access on a separate line from element accesses b0-b7 from the second vector access. Note that access b1 occurs before access a1 which would give an incorrect result if a1 and b1 access the same address. (b2 and a2 are also incorrectly reordered.)

Two embodiments are described below relating to coalescing of accesses to the same cache line and accesses to banked memory.

As noted above, to simplify support for exception handling, the checked address mode flag can be cleared when an exception is taken. (This will disable the optimization until another start instruction is encountered so there is a tradeoff between preserving the checked address mode flag across exceptions and performance.)

Start and stop instructions can be combined with other instructions. For example, a backward branch could be treated as a stop instruction.

Since the start of one loop iteration is also the end of the previous loop iteration, it is useful to combine the start and stop instructions into a single instruction. This behaves like a barrier between loop iterations indicating that element accesses from different loop iterations cannot be safely reordered without performing a dependency check.

The start instruction could indicate different patterns of legal reordering. For example, instead of requiring 'j<k' as above, it could indicate that element accesses cannot be reordered if 'j<=k' or, more generally, for some constant 'd', they cannot be reordered if 'j<k−d'. (This pattern occurs if the loop contains code like ' . . . =A[i+d]; A[i]= . . . ')

Instead of using start and stop instructions, we could insert 'partial barriers'. Whereas a conventional barrier prevents reordering of element accesses on either side of the barrier, a 'partial barrier' prevents reordering of element accesses if 'j<k'.

Instead of using start and stop instructions, we could have instructions that set a current 'barrier mode'. The barrier mode can be one of 'full, partial or none'. The current barrier mode affects all subsequent memory accesses by inserting either an implicit barrier or a partial barrier or no barrier before the memory access. Setting the current barrier mode to 'partial' behaves like the start instruction and setting the current barrier mode to 'none' behaves like the stop instruction.

A 'CheckHazard' instruction which tests two vectors of addresses to determine if any addresses in position j of one vector overlap with any addresses in some position k (j<k) of the other vector. This instruction can be used to dynamically test (and deal with) any overlaps that would prevent the loop from being vectorized. This instruction works especially well with embodiments of the invention because it tests for exactly the case we care about. (There is also a CheckhazardX instruction that checks positions such that j<=k.)

Also described is a compiler capable of emitting the start/end instructions into vectorized code. This requires:

A compiler that vectorizes a loop

And which inserts start instructions at the start of the loop body and end instructions at the end of the loop body. (The task of vectorizing a loop involves performing an analysis to determine which memory dependencies exist. So if the compiler successfully vectorizes the loop, it already knows that the memory accesses within a vectorized loop do not conflict.)

This basic scheme can be enhanced in various ways:

In some circumstances, the compiler can instead insert a start instruction before the loop and an end instruction after the loop. For example, it can do this if it determines that all accesses performed by the loop are to distinct addresses.

In some circumstances, the compiler can insert a modified start instruction that indicates different patterns of legal reordering. For example, if it determines that all accesses performed inside a block of code are to distinct addresses, then it can emit a start instruction that indicates that 'j<=k' is correct or that any reordering is correct.

Coalescing Cache Accesses

It is useful to coalesce accesses to the same cache line both to improve performance and to reduce energy. In vector accesses, coalescing is typically performed within a single vector access to exploit locality within a vector but it is common for there to be significant locality between corresponding element positions in two vector accesses. For example, vectorizing a loop containing these two statements:

A[i][j].x=p;

A[i][j].y=q;

Will result in a loop that contains two vector store instructions and, on a given iteration of the loop, the first vector store instruction may write to addresses: [1000,2000,3000, 4000, . . . ] while the second vector store instruction writes to addresses [1004, 2004, 3004, 4004, . . . ]. In this case, there is no locality within each vector access but there is considerable locality between the vector accesses and, ideally, the accesses would be performed in the order [1000, 1004, 2000,2004, 3000,3004, 4000,4004, . . . ].

This allows the accesses to be coalesced into a single access as illustrated in FIG. 10 below.

The following describes a realization of an embodiment of the invention that is able to perform such coalescing.

A pair of new instructions indicating the start and end of a block of code

A load-store unit

With a flag indicating if it is executing in 'checked address mode'

Which sets the flag on encountering the start instruction and clears the flag on encountering the end instruction.

With two vector memory unit (VMU) each containing:

An element index indicating which element is to be stored next

A flag indicating whether the VMU is performing a read a write or is idle

A flag indicating whether there is a pending access in the VMU (if not idle)

The address of the next pending access (if there is a pending access)

The value of the next pending access (if it is a write)

With a comparator to compare the element indexes in the two VMUs

With a comparator to compare whether the addresses of the next pending access of the VMUs are to the same cache line.

With a multiplexer to select the next element from one VMU or the other such that:

When the checked address mode flag is clear, accesses are taken from the first VMU unless the first VMU is idle or both accesses are reads.

When the checked address mode flag is set, accesses from the first and second VMU are combined into a single cache access if j<=k and the next pending accesses are to the same cache line.

When the checked address mode flag is set, and the next pending accesses are to different cache lines and j<k, the access from the second VMU is selected Otherwise, the access from the second VMU is selected.

It will be appreciated that this uses a single address comparator to detect element accesses that may be coalesced and only requires simultaneous storage of one element access from each of the two vector operations. Without utilising an embodiment of the invention, the same degree of reordering would require simultaneous storage of all element accesses from the first vector operation and would require 7 address comparators (for a vector length of 8).

In practice, spatial locality can be found within vector accesses as well as between vector accesses. For example, a first vector access may access elements at addresses [1000, 1008,1016,1024, . . . ] while a second vector access may access elements at addresses [1004,1012,1020,1028, . . . ] In this case, it is desirable to coalesce element accesses within a vector access and to coalesce accesses between vector accesses. FIG. 11 illustrates such a case where pairs of element accesses from a first vector operation are coalesced with pairs of element accesses from a second vector operation. This executes in 4 cycles compared with 16 cycles with no coalescing or 8 cycles if coalescing only occurs between vector operations or if coalescing only occurs within vector operations.

FIG. 11 shows a coalesced access pattern shown with time proceeding from left to right and element accesses a0-a7 from the first vector access on a separate line from element accesses b0-b7 from the second vector access. Note that consecutive element accesses from the first vector operation have been coalesced with each other and with consecutive element accesses from the second vector operation and occur at the same time.

The above realization can be enhanced to support this behaviour by
- extending both VMUs to
  - buffer the address (and data, for writes) of multiple accesses
  - compare the addresses of adjacent element accesses within each VMU to identify sequences of consecutive element accesses within each VMU which are candidates for coalescing. This requires one additional comparator per VMU if element accesses are added to the VMU sequentially.
- if the addresses of the next element accesses are to the same cache line and the first VMU contains m consecutive accesses to that cache line and the second VMU contains n consecutive accesses to that cache line then m elements from the first VMU and 'min(j+m,k+n)−k' elements from the second VMU can be coalesced into a single cache access.

Banked Memory Access

Figure 12:
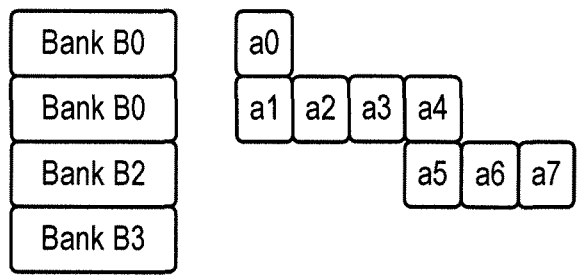
FIG. 12 shows a banked access pattern.

Programs with gather scatter vector memory access instructions can have a high address bandwidth (i.e., more addresses are presented to the memory system per cycle) and therefore benefit from a memory system that can perform multiple accesses per cycle. This is frequently implemented by splitting the memory system into a number of independently accessible banks and arranging the address map such that a vector memory access will typically access multiple banks—allowing the accesses to be performed in parallel with each other. This banking can be applied to several different parts of the memory system: the TLB, the L1 cache, the L2 cache, the DRAM controllers, etc. For example, the cache may be split into four independently accessible banks B0, B1, B2 and B3 and bits 6 and 7 of the address of an element used to select which of the four banks is used to store that address. A vector access consisting of element accesses a0-a7 can be performed by examining bits 6 and 7 of the address of each element access and directing it to one of the four banks. FIG. 12 illustrates the access pattern that would result from a vector access to addresses [60,76,92,108,124,140,156,172] (which map onto banks [B0,B1,B1,B1,B1,B2,B2,B2,B2,B3]) assuming a Vector Memory Unit that issues element accesses in order at up to 2 element accesses per cycle. The complete vector operation requires 6 cycles even though no bank performs more than 4 element accesses.

Figure 13:
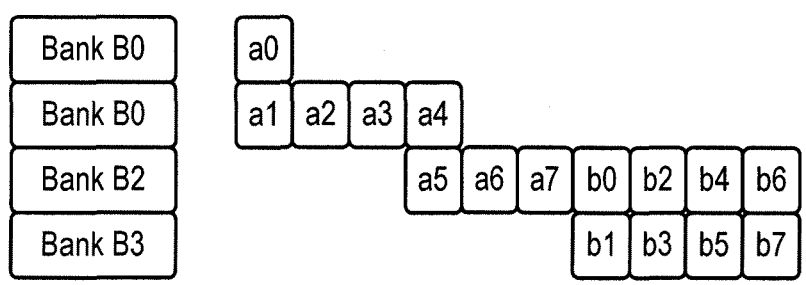
FIG. 13 shows a further banked access pattern.

FIG. 13 illustrates the access pattern that would result when not in checked address mode if the first vector operation were followed by a second vector operation to addresses [192,132,196,136,200,140,204,144] (which map onto banks [B3,B2,B3,B2,B3,B2,B3,B2]). Since it is not in checked address mode (i.e., an embodiment of the invention is not being used) no element access from the second vector operation is performed until after all the element accesses from the first vector operation. The two vector operations require 10 cycles to complete.

Figure 14:
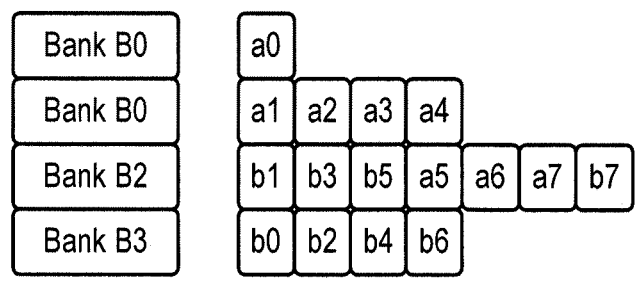
FIG. 14 shows an unsafe banked access pattern.

FIG. 14 illustrates that it is not safe to allow the second vector operation to proceed in parallel with the first vector operation. Note that access a5 and access b5 are both to address 140 and that access b5 is incorrectly performed before access a5 in this figure. (If this sequence were legal, it would require 7 cycles.)

Figure 15:
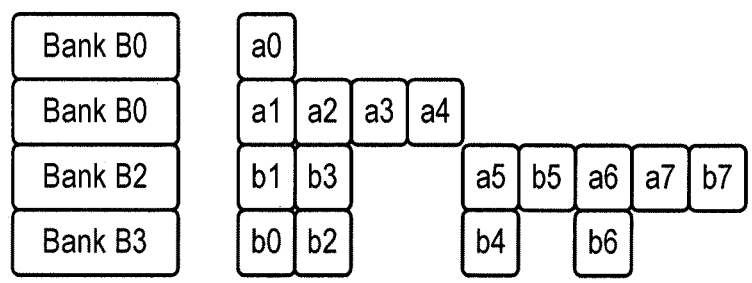
FIG. 15 shows a safe interleaved banked access pattern.

FIG. 15 illustrates the same access pattern executing correctly. Even though access b5 is available in the third cycle, the access is delayed until after access a5 has been performed to ensure that accesses are safely interleaved within each bank. Note too that access b4 is not performed before a4 since it is not possible to determine whether they access the same bank until they are both accessible. Likewise, access b6 is not performed before access a6. By making use of an embodiment of the invention, this access pattern completes in 8 cycles—a saving of 2 cycles.

Finally, it is worth saying that although address comparators are not required to support interleaving, it is possible to add address comparators to allow additional reordering beyond that directly supported by embodiments of the invention. That is, to allow a small amount of interleaving of accesses between one iteration of a loop and the next iteration, the code before/after the loop or the next vectorized loop. Since the comparators have less work to do, we can achieve good performance with less of them and/or clock-gate the comparators more often.

Figure 16:
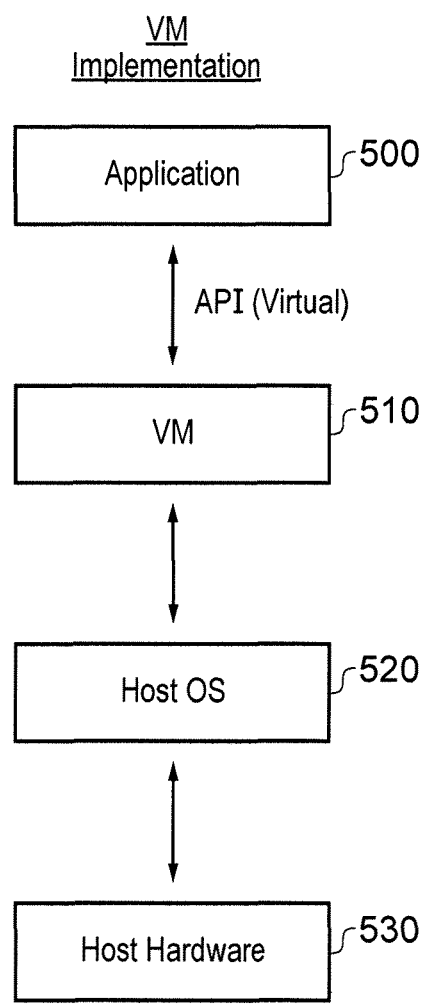
FIG. 16 shows a virtual machine implementation of an embodiment of the present invention.

FIG. 16 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 typically running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 is capable of executing an application program (or operating system) 500 to give the same results as would be given by execution of the program by such a real hardware device. Thus, the ordering of data accesses to be performed may be executed from within the application program 500 using the virtual machine program 510.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of compiling a computer program, comprising:

analysing said computer program and identifying loops within said computer program and converting scalar instructions within said loops to vector instructions, said vector instructions comprising vector data access instructions, each of said vector data access instructions specifying a plurality of elements, each of said elements indicating a data access to be performed;

identifying a first vector data access instruction and a second vector data access instruction within said computer program where interleaving of data accesses from said first and second vector data access instructions, subject to a limited interleaving constraint, would not cause a data error;

inserting a start limited interleaving instruction into said computer program prior to said first vector data access instruction, said start limited interleaving instruction providing an indication to a vector data access unit that data accesses from said first and second vector data access instructions can be interleaved subject to said limited interleaving constraint;

said limited interleaving constraint being that a next data access indicated by an element from said second vector data access instruction is issued when a numerical position of said element within said plurality of elements of said second vector data access instruction subtracted from a numerical position of an element indicating a next data access of said first vector data access instruction is less than a predetermined value, and when it is not less than said predetermined value, a data access from said first vector data access instruction is issued; and transforming said computer program into code suitable for execution on a data processing system.

2. A method according to claim 1, comprising an initial analysing step of identifying said loops within said computer program and converting scalar instructions within said loops to vector instructions.

3. A method according to claim 1, wherein said start limited interleaving instruction comprises said predetermined value.

4. A method according to claim 1, wherein said identifying said first and second vector data access instructions comprises identifying at least one further vector data access instruction where interleaving of data accesses from said first, second and at least one further vector data access instructions, subject to said limited interleaving constraint, would not cause a data error; and said limited interleaving constraint being that a next data access indicated by an element from one of said identified vector data access instructions occurring later in said computer program code is issued when a numerical position of said element within said plurality of elements of said one identified vector data access instruction occurring later subtracted from a numerical position of an element indicating a next data access of another one of said vector data access instructions occurring earlier in said program code is less than said predetermined value, and when it is not less than said predetermined value a data access from said another one vector data access instruction is issued.

5. A method according to claim 1, comprising a further step of inserting a stop limited interleaving instruction after said identified first and second vector data access instructions.

6. A method according to claim 1, comprising a further step of identifying backward branches within said computer program and only inserting start interleaving instructions and not stop interleaving instructions where said backward branches are located at an end of a block of code containing said first and second identified vector data access instructions.

7. A compiler for compiling a computer program, comprising:

analysing circuitry to analyze said computer program and identify loops within said computer program and convert scalar instructions within said loops to vector instructions, said vector instructions comprising vector data access instructions, each of said vector data access instructions specifying a plurality of elements, each of said elements indicating a data access to be performed;

identify a first vector data access instruction and a second vector data access instruction within said computer program where interleaving of data accesses from said first and second vector data access instructions, subject to a limited interleaving constraint, would not cause a data error;

instruction generating circuitry to generate a start limited interleaving instruction and to insert said start limited interleaving instruction into said computer program prior to said first vector data access instruction, said start limited interleaving instruction providing an indication to a vector data access unit that data accesses from said first and second vector data access instructions can be interleaved subject to said limited interleaving constraint;

said limited interleaving constraint being that a next data access indicated by an element from said second vector data access instruction is issued when a numerical position of said element within said plurality of elements of said second vector data access instruction subtracted from a numerical position of an element indicating a next data access of said first vector data access instruction is less than a predetermined value, and when it is not less than said predetermined value, a data access from said first vector data access instruction is issued; and transforming circuitry to transform said computer program into code suitable for execution on a data processing system.

* * * * *